(12) United States Patent
Yang et al.

(10) Patent No.: US 7,381,843 B2
(45) Date of Patent: Jun. 3, 2008

(54) METHOD FOR PREPARING HYDROXYLAMINE

(75) Inventors: Shu-Hung Yang, Taipei (TW); Shou-Li Luo, Taipei (TW)

(73) Assignee: China Petrochemical Development Corporation, Taipei (TW)

( * ) Notice: Subject to any disclaimer, the term of this patent is extended or adjusted under 35 U.S.C. 154(b) by 0 days.

(21) Appl. No.: 11/534,167

(22) Filed: Sep. 21, 2006

(65) Prior Publication Data

US 2007/0231240 A1 Oct. 4, 2007

(30) Foreign Application Priority Data

Mar. 29, 2006 (TW) .............................. 95110888 A

(51) Int. Cl.
*C07C 239/08* (2006.01)
(52) U.S. Cl. ....................... 564/301; 564/300; 430/302
(58) Field of Classification Search ................ 564/300, 564/301; 423/302
See application file for complete search history.

(56) References Cited

U.S. PATENT DOCUMENTS 3,767,758 A * 10/1973 Mars et al. .................. 423/302
4,889,704 A * 12/1989 Fuchs et al. ................. 423/387
5,777,163 A * 7/1998 Muller et al. ................ 564/301

* cited by examiner

*Primary Examiner*—Shailendra Kumar
(74) *Attorney, Agent, or Firm*—Sughrue Mion, PLLC

(57) ABSTRACT

A method for preparing hydroxylamine by reducing nitric acid or its salt with hydrogen gas in an aqueous medium in the presence of a catalyst, wherein reduction of nitric acid or its salt is performed in a reactor comprising a reaction section, a cooler disposed at the lower portion of the reactor, and a middle gas distributor and a lower gas distributor respectively disposed above and below the cooler for introducing hydrogen gas into the reaction section. According to the present invention, gas distribution become more uniform by disposing the gas distributors at different positions of the reactor, which results in higher yield of hydroxylamine.

7 Claims, 4 Drawing Sheets

METHOD FOR PREPARING HYDROXYLAMINE

FIELD OF THE INVENTION

The present invention relates to a method for preparing hydroxylamine, and more particularly, to a method for preparing hydroxylamine by reduction of nitric acid or its salt with hydrogen gas.

BACKGROUND OF THE INVENTION

Hexanolactam is an important starting material for manufacturing polyamide (also referred to as nylon). Hexanolactam is conventionally prepared by a method comprising reacting hydroxylamine with cyclohexanone to give cyclohexanone oxime, and then subjecting said cyclohexanone oxime to Beckman rearrangement to yield hexanolactam. Therefore, hydroxylamine is one of the important starting materials for hexanolactam production. Hydroxylamine is usually prepared by reducing nitric acid or its salt with hydrogen gas in presence of a mono metal catalyst such as palladium/carbon, or a double metal catalyst such as palladium-platinum carbon. However, pure hydroxylamine is unstable and decomposes automatically upon heating, which may result in explosion. So, hydroxylamine is usually prepared in a form its salt with an acid, such as hydroxylammonium sulfate, hydroxylammonium chloride, or hydroxylammonium phosphate, wherein hydroxylammonium phosphate is preferred.

Hydroxylamine is prepared in a gas/liquid/solid triple phase bubbling reaction system. As such a reaction system is a heterogeneous system, the reaction is affected not only by catalyst concentration, hydrogen pressure, hydrogen ion concentration, and the surface area of the catalyst, but also affected by mass transfer among gas, liquid and solid phases. The reaction scheme for preparation of hydroxylamine is as shown below:

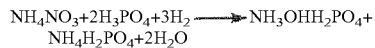

$NH_4NO_3 + 2H_3PO_4 + 3H_2 \longrightarrow NH_3OHH_2PO_4 + NH_4H_2PO_4 + 2H_2O$ In the prior art, hydroxylamine was prepared, for example, in a reactor as shown in FIG. 1. Referring to FIG. 1, a reactor 10' includes a reaction section 12', a cooler 14' disposed at the lower part of the reactor 10', and a gas distributor 16' disposed above the cooler 14'. An phosphate-buffered aqueous medium containing nitrate ions is fed to the reactor 10' through a pipe 22'. Fresh hydrogen gas is delivered to a gas distributor 16' of the reactor 10' through a pipe 24' and then introduced into the reaction section 12'. In the reaction section 12', nitric acid or its salt contained in the phosphate-buffered aqueous medium is reduced by hydrogen gas to form hydroxylammonium phosphate. The aqueous medium containing the produced hydroxylammonium phosphate leaves the reactor 10' through a pipe 30'. The unreacted hydrogen gas leaves the reactor 10' through a pipe 32' at the top of the reactor 10', and is treated in a separator (not shown). The treated hydrogen gas after mixing with fresh hydrogen gas is circulated back to the gas distributor 16' of the rector 10', and reintroduced into the reaction section 12'.

In said method for preparation of hydroxylammonium phosphate, the hydrogen gas is fed into a reactor 10' through a gas distributor 16' at the middle part of the reactor, resulting in uneven distribution of hydrogen gas in the reactor 10', and occurrence wall flow, channeling phenomenon etc., which adversely affects the efficiency of mass transfer among gas, liquid and solid phases during the reaction, and lowers the yield of hydroxylamine.

Therefore, it is desired to provide a method for preparing hydroxylamine in a gas/liquid/solid triple phase reaction system with high yield.

SUMMARY OF THE INVENTION

To overcome the above-mentioned problems of the prior at, it is an object of this invention to provide a method for preparing hydroxylamine with high yield.

Another object of this invention is to provide a method for preparing hydroxylamine, in which mass transfer among gas, liquid and solid phases is enhanced.

A further object of this invention is to provide a method for preparing hydroxylamine, in which catalyst activity is increased.

Still another object of this invention is to provide a method for preparing hydroxylamine, in which reaction selectivity is increased.

To achieve the aforementioned and other objects, provided is a method for preparing hydroxylamine by reducing nitric acid or its salt with hydrogen gas in an aqueous medium in the presence of a catalyst, said reduction of nitric acid or its salt is performed in a reactor comprising a reaction section, a cooler disposed at the lower part of the reactor, and a middle gas distributor and a lower gas distributor respectively disposed above and below the cooler for introducing hydrogen gas into the reaction section. As hydrogen gas is introduced into the reaction section respectively from the middle gas distributor and the lower gas distributor, gas distribution will become more uniform, resulting in higher efficiency of mass transfer among gas, liquid and solid phases in the reactor, which leads to increased catalyst activity and increased selectivity to hydroxylamine; in turn, leads to higher yield of hydroxylamine.

DETAILED DESCRIPTION OF THE INVENTION

The present invention provides a method for preparing hydroxylamine by reducing nitric acid or its salt with hydrogen gas in an aqueous medium in the presence of a catalyst, said reduction of nitric acid or its salt is performed in a reactor comprising a reaction section, a cooler disposed at the lower portion of the reactor, and a middle gas distributor and a lower gas distributor respectively disposed above and below the cooler for introducing hydrogen gas into the reaction section.

Reduction of nitric acid or its salt to hydroxylamine can be performed at any proper temperature, for example, at a temperature from 20° C. to 100° C., preferably from 30° C. to 90° C., and more preferably from 40° C. to 65° C.

The catalyst used in the reaction is a noble metal catalyst supported by a catalyst carrier. Examples of the catalyst include a mono metal catalyst such as palladium/carbon, a double metal catalyst such as palladium-platinum/carbon, and the like. Examples of the catalyst carrier include, but not limited to, a carbon carrier or an aluminum carrier, preferably a carbon carrier. The amount of noble metal in the catalyst, based on the total amount of noble metal and the carrier, is in the range from 1 to 25% by weight, and preferably from 5 to 15% by weight. The noble metal catalyst is used in an amount of 0.2 to 5% by weight, based on the total weight of the aqueous medium.

The aqueous medium is generally adjusted to acidic pH with sulfuric acid or phosphoric acid; preferably the aqueous medium is buffered with phosphoric acid.

The reactors suitable for use in preparation of hydroxylamine are illustrated by the following embodiments. The present invention can also be performed or applied by other different embodiments. The present invention may be modified and varied on the basis of different points and applications without departing from the spirit of the present invention.

As used herein, selectivity to hydroxylamine and catalyst activity are defined as follows:

selectivity to hydroxylamine=yield of hydroxylamine/consumption of nitric acid or its salt×100%, catalyst activity=yield of hydroxylamine per unit time per gram of palladium catalyst.

Figure 2:
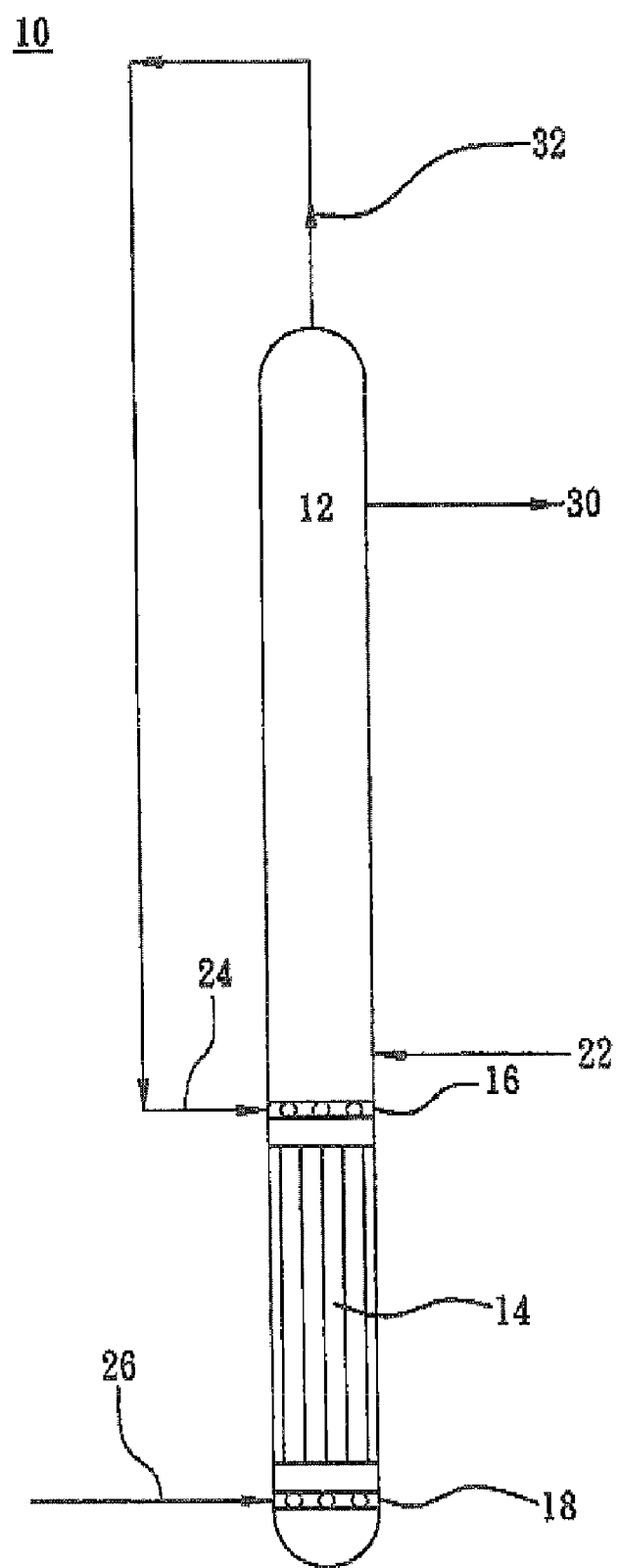
FIG. 2 is a schematic diagram of a reactor according to the first embodiment of the present invention.

In the first embodiment of the present invention, a reactor 10 as shown in FIG. 2 is used. The reactor 10 includes a reaction section 12 comprising a catalyst, a cooler 14 disposed at the lower pan of the reactor 10, and a middle gas distributor 16 and a lower gas distributor 18 disposed above and below the cooler 14, respectively. A phosphate-buffer aqueous medium containing nitric acid or its salt is fed to the reaction section 12 through a pipe 22. Fresh hydrogen gas is delivered to the lower gas distributor 18 of the reactor 10 through a pipe 26 and then introduced into the reaction section 12. In the reaction section 12, nitric acid or its salt in the phosphate-buffered aqueous medium is reduced by hydrogen gas to form hydroxylammonium phosphate. The aqueous medium containing the produced hydroxylammonium phosphate leaves the reactor 10 through a pipe 30. The concentration of hydroxylammonium phosphate in the aqueous medium is usually amounted to more than 0.9 mole/kg, preferably more than 1.0 mole/kg, and more preferably more than 1.1 moles/kg. The unreacted hydrogen gas is discharged from the reactor 10 through a pipe 32, and then treated in a separator (not shown). The treated hydrogen gas is circulated back to the middle gas distributor 16 of the reactor 10 through a pipe 24 and reintroduced into the reaction section 12. The heat produced during the reaction is removed by a cooler 14.

In the first embodiment of the present invention, the circulated hydrogen gas and fresh hydrogen gas are introduced into the reaction section 12 of the reactor 10 respectively from the middle gas distributor 16 and the lower gas distributor 18 such that gas distribution will become more uniform, resulting in higher efficiency of mass transfer among gas, liquid and solid phases in the reactor 10, which leads to increased catalyst activity and increased selectivity to hydroxylamine; in turn, leads to higher yield of hydroxylamine.

Figure 3:
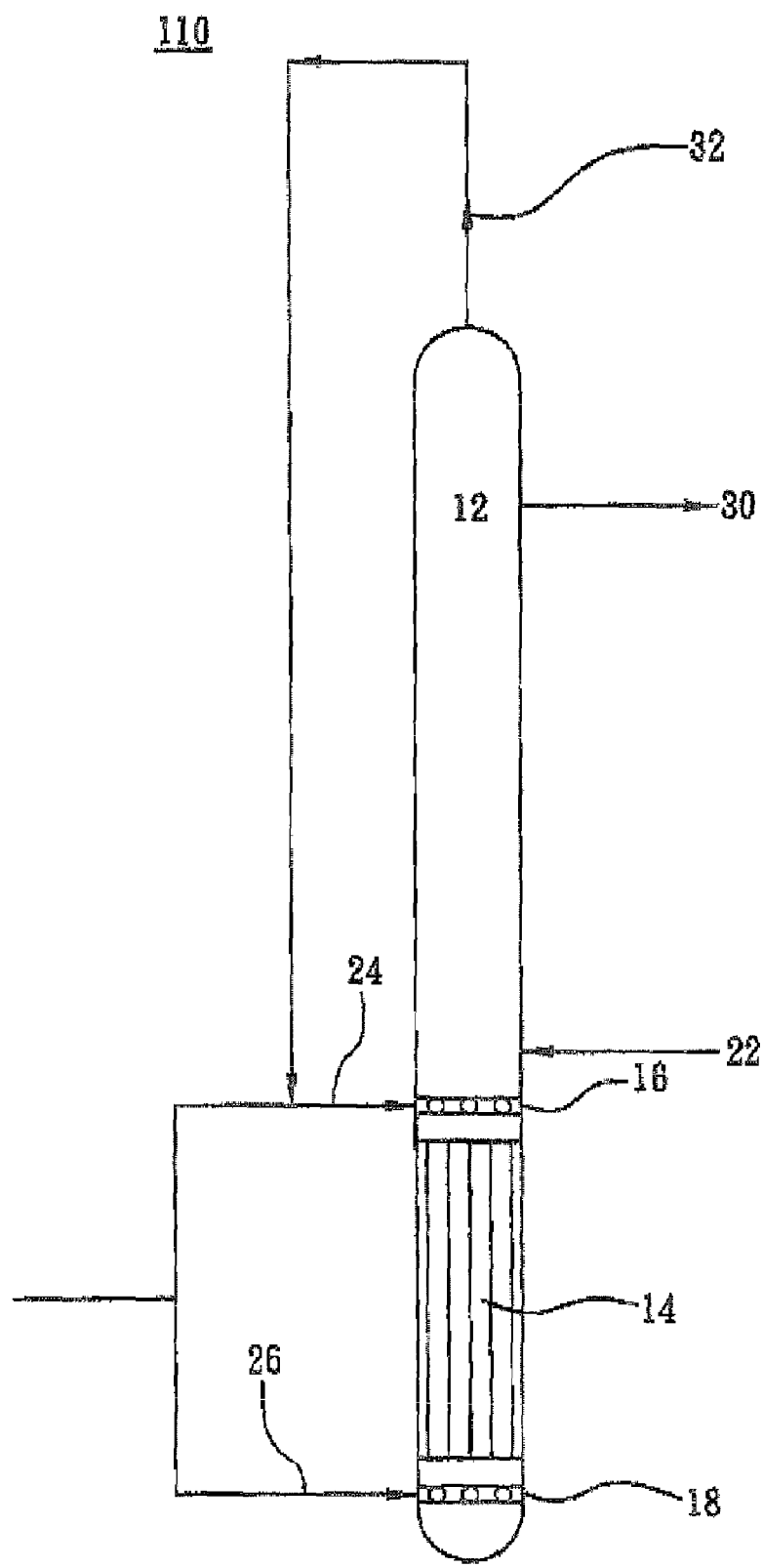
FIG. 3 is a schematic diagram of a reactor according to the second embodiment of the present invention.

In the second embodiment of the present invention, a reactor 110 as shown in FIG. 3 is used. The structure and operation of the reactor 110 is the same as those of the reactor 10 in the first embodiment, except the unreacted hydrogen gas, after discharged from the reactor 110 through the pipe 32 and treated in a separator (not shown), is mixed with a part of the fresh hydrogen gas and then reintroduced into the middle gas distributor 16 of the reactor 110 through the pipe 24; and the rest fresh hydrogen gas is introduced into the lower gas distributor 18 of the reactor 110 through the pipe 26.

Figure 4:
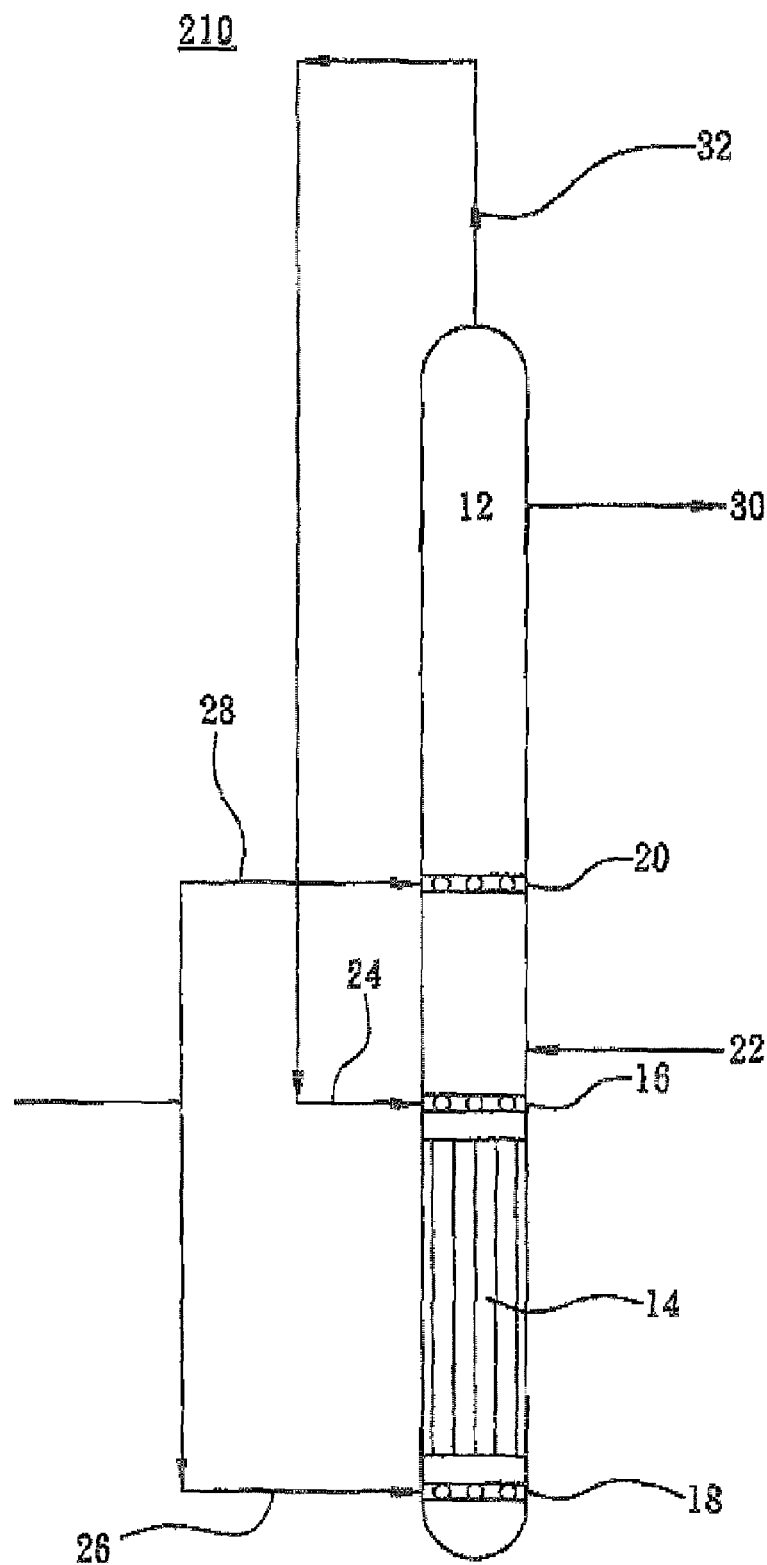
FIG. 4 is a schematic diagram of a reactor according to the third embodiment of the present invention.

In the third embodiment, a reactor 210 as shown in FIG. 4 is used. The reactor 210 has the same structure as the reactor 10 in the first embodiment, except an upper gas distributor 20 is further disposed at the upper part of the reaction section 12, preferably above the pipe 22 for delivering phosphate-buffered aqueous medium. The reactor 210 is operated in the same manner as in the first embodiment, except part of the fresh hydrogen gas is delivered to the upper gas distributor 20 through a pipe 28 and the rest fresh hydrogen gas is delivered to the lower gas distributor 18 through the pipe 26. The unreacted hydrogen gas is recovered through a pipe 32 and is circulated back to the middle gas distributor 16 through the pipe 24. The ratio of the hydrogen gas delivered to the lower gas distributor:the hydrogen gas delivered to the upper gas distributor can be varied depending on the operating conditions, and is usually, for example, about 2:1.

EXAMPLES

Example 1

A reactor 10 as shown in FIG. 2 was used. An aqueous medium containing 0.04 mole of hydroxylammonium phosphate, 2.89 moes of hydrogen ions, 2.46 moles of phosphoric acid and 0.26 mole of free nitric acid, per kilogram of the total weight of the aqueous medium, was fed to the reaction section 12 of the reactor 10 rough a pipe 22 at a flow rate of 130 $M^3$ per hour. Fresh hydrogen gas was delivered to the lower gas distributor 18 of the reactor 10 through a pipe 26 and then introduced into the reaction section 12. In the reaction section 12, nitric acid or its salt contained in the phosphate-buffered aqueous medium is reduced by hydrogen gas in the presence of a 10 wt % palladium/active carbon catalyst at 55% hydrogen partial pressure and 53° C. The unreacted hydrogen gas was recovered through a pipe 32 and circulated back to the middle gas distributor 16 of the reactor 10 through a pipe 24. The concentration of the produced hydroxylammonium phosphate in the aqueous medium at the exit of the reactor 10 was 1.15 moles per kilogram of the total weight of the aqueous medium, the selectivity to hydroxylamine was 85.5%, and the catalyst activity was 26.6 g of hydroxylamine per hour per gram of palladium.

Example 2

A reactor 210 as shown in FIG. 4 was used. An aqueous reaction medium containing 0.04 mole of hydroxylammonium phosphate, 2.89 moles of hydrogen ions, 2.46 moles of phosphoric acid and 0.26 mole of free nitric acid, per kilogram of the total weight of the aqueous medium, was fed to the reactor 10 through a pipe 22 at a flow rate of 130 $M^3$ per hour. Fresh hydrogen gas was delivered to the lower gas distributor 18 of the reactor 210 and the upper gas distributor 20 of the reactor 210 through a pipe 26 and a pipe 28 respectively. The ratio of the fresh hydrogen gas delivered to the lower gas distributor 18:the fresh hydrogen gas delivered to the upper gas distributor 20, was 2 to 1. In the reaction section 12, nitric acid or its salt contained in the phosphate-buffered aqueous medium is reduced by hydrogen gas the presence of a 10 wt % palladium/active carbon catalyst at 55% hydrogen partial pressure and 53° C. The unreacted hydrogen gas was recovered and circulated back to the middle gas distributor 16 of the reactor 210 through a pipe 24. The concentration of the produced hydroxylammonium phosphate in the aqueous medium at the exit of the reactor 210 was 1.06 moles per kilogram of the total weight of the aqueous medium, selectivity to hydroxylamine was 83.5%, and catalyst activity was 25.3 g of hydroxylamine per hour per gram of palladium.

Comparative Example 1

Figure 1:
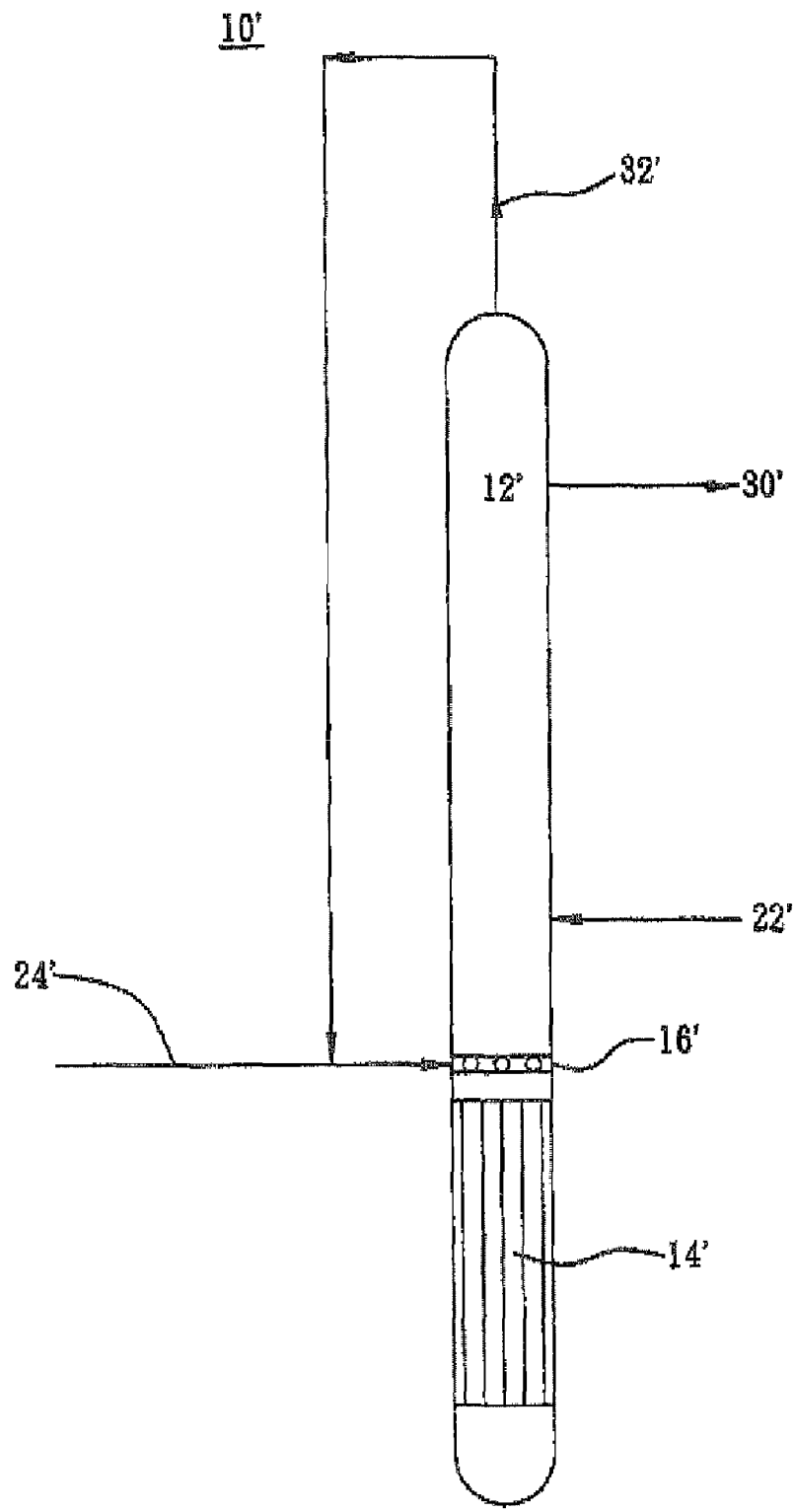
FIG. 1 is a schematic diagram of a conventional reactor for production of hydroxylamine.

A reactor 10' as shown in FIG. 1 was used. An aqueous reaction medium containing 0.04 mole of hydroxylammonium phosphate, 2.89 moles of hydrogen ions, 2.46 moles of phosphoric acid and 0.26 mole of free nitric acid, per kilogram of the total weight of the aqueous medium, was fed to the reactor 10' through a pipe 22' at a flow rate of 130 $M^3$ per hour. Fresh hydrogen was delivered to the middle gas distributor 16' of the reactor 10' through a pipe 24' and then introduced into the reaction section 12'. In the reaction section 12', nitric acid or its salt contained in the phosphate-buffered aqueous medium is reduced by hydrogen gas in the presence of a 10 wt % palladium/active carbon catalyst at 55% hydrogen partial pressure and 53° C. The unreacted hydrogen gas was recovered through a pipe 32', which is then mixed with fresh hydrogen gas and delivered to the middle gas distributor 16' of the reactor 10' through a pipe 24' for reintroduction into the reaction section 12'. The concentration of the produced hydroxylammonium phosphate in the aqueous medium at the exit of the reactor 10' was 0.83 mole per kilogram of the total weight of the aqueous medium, selectivity to hydroxylamine was 76.6%, and catalyst activity was 19.4 g of hydroxylamine per hour per gram of palladium.

From comparison of the results of Examples 1 and 2 and Comparative Example, it can be seen that catalyst activity and selectivity to hydroxylamine are significantly increased and higher yield of hydroxylamine are obtained according to the present invention. It is believed that such higher yield results from more uniform gas distribution by disposing the gas distributors at different positions of the reactor, which will increase efficiency of mass transfer among gas, liquid and solid phases and avoid occurrence of wall flow, channeling phenomenon, and the like in the reactor.

The foregoing detailed description of the embodiments is for illustrating the features and effects of the present invention and not for limiting the scope of the present invention. Those skilled in the art will appreciate that modifications and variations according to the spirit and principle of the present invention could be made. All such modifications and variations are considered to fall within the spirit and scope of the present invention as defined by the appended claims.

What is claimed is:

1. A method for preparing hydroxylamine by reducing nitric acid or its salt with hydrogen gas in an aqueous medium in the presence of a catalyst, characterized in that the reduction of nitric acid or its salt is performed in a reactor comprising a reaction section, a cooler disposed at a lower portion of the reactor, and a middle gas distributor and a lower gas distributor respectively disposed above and below the cooler for introducing hydrogen gas into the reaction section, wherein first fresh hydrogen gas is introduced into the reaction section through the lower gas distributor and unreacted hydrogen gas is recovered from the top of the reactor and circulated back to the reaction section through the middle gas distributor.

2. The method according to claim 1, wherein the unreacted hydrogen gas, after being mixed with a second fresh hydrogen gas, is introduced into the reaction section through the middle gas distributor, and the first fresh hydrogen gas is introduced into the reaction section through the lower gas distributor.

3. A method according to claim 1, wherein an upper gas distributor is further disposed in the reaction section.

4. The method according to claim 3, wherein part of the first fresh hydrogen gas is introduced into the reaction section through the lower gas distributor and the rest of the first fresh hydrogen gas is introduced into the reaction section through the upper gas distributor.

5. A method according to claim 1, wherein reduction of nitric acid or its salt is performed at a temperature from 20° C. to 100° C.

6. A method according to claim 1, wherein the catalyst is palladium/carbon catalyst.

7. A method according to claim 1, wherein the aqueous medium is a phosphate-buffered aqueous medium.

* * * * *